United States Patent [19]

Cassens, Jr.

[11] 4,454,239

[45] Jun. 12, 1984

[54] CARBONACEOUS REFRACTORY COMPOSITION FOR PRESSING BRICK SHAPES

[75] Inventor: Nicholas Cassens, Jr., Pleasanton, Calif.

[73] Assignee: Kaiser Aluminum & Chemical Corporation, Oakland, Calif.

[21] Appl. No.: 497,994

[22] Filed: May 25, 1983

Related U.S. Application Data

[63] Continuation of Ser. No. 367,713, Apr. 12, 1982, abandoned.

[51] Int. Cl.$^3$ .............................................. C04B 35/54
[52] U.S. Cl. ...................................... 501/99; 501/100; 501/101
[58] Field of Search ................................... 501/99–101

[56] References Cited

U.S. PATENT DOCUMENTS

| | | | |
|---|---|---|---|
| 4,113,501 | 9/1978 | Edamoto | 501/100 |
| 4,238,721 | 12/1980 | Harita et al. | 501/101 |
| 4,248,638 | 2/1981 | Yomota et al. | 501/101 |

*Primary Examiner*—James Poer
*Attorney, Agent, or Firm*—Malcolm McQuarrie

[57] ABSTRACT

A more pressable composition for making graphitic refractory brick from oxide aggregate with a carbon bond is obtained when the refractory oxide aggregate is substantially all coarser than 0.15 mm (+100 mesh), preferably coarser than 0.2 mm (+65 mesh), and most preferably coarser than 0.4 mm (+35 mesh), and the matrix is entirely carbonaceous material, such as graphite, particularly flake graphite, resin, particularly a phenol formaldehyde resin, together with such other carbonaceous materials as carbon black, calcined coke, anthracite, and the like.

12 Claims, No Drawings

CARBONACEOUS REFRACTORY COMPOSITION FOR PRESSING BRICK SHAPES

This is a continuation of application Ser. No. 367,713, filed Apr. 12, 1982, now abandoned.

BACKGROUND OF THE INVENTION

This invention pertains to carbonaceous refractory compositions, particularly such compositions suited for pressing into brick shape.

It is known to form a refractory brick by pressing a composition of refractory aggregate (for example, refractory periclase grain) combined with a pitch bond which may also contain other carbonaceous materials, such as carbon black, graphite, and the like. In order to form a pressed brick which has adequate strength to be handled and shipped without slumping or breaking, it is customary to use a bonding pitch with a high (for example, 110° C.) softening point. This means that the brick must be formed (pressed) with a hot aggregate/pitch mixture which, when it cools, hardens to form a strong, coherent brick.

In recent years, for various reasons, for example, to avoid working with hot pitch mixtures, it has become the practice to use a synthetic resin, for example a phenol formaldehyde resin, as bond. These resins can be used in liquid form at room temperature to form the brick and are then set by heating at temperatures of, for example, 110° to 300° C. to form strong, hard, refractory shapes.

These products are placed in service without firing at elevated temperatures, although they may be tempered at temperatures up to 500° C. and, in rare instances, coked at temperatures up to 1000° C. When placed in service in a furnace which is raised to an elevated temperature, the carbonaceous materials in the brick coke, forming a carbon bond.

When a synthetic resin bond was substituted for the tar or pitch bond in refractories containing graphite, it was found that the substitution led to low density, high porosity, and lowered strength in the brick. In other words, the bonding of the grains by the matrix was generally poorer when the resin was substituted directly for the pitch in prior compositions.

The present invention is directed to the solution of this problem. In other words, the present invention permits the forming of resin-bonded, graphite-containing refractory compositions into brick which have as high density and strength, and as low porosity, as the former tar or pitch-bonded refractories containing graphite. In addition, the invention has further application in that it also improves the properties of graphitic refractory brick bonded with a natural resin, such as coal tar pitch.

SUMMARY OF THE INVENTION

The foregoing problem is solved by using a carbonaceous refractory composition for pressing brick shapes consisting essentially of (1) from 60 to 90% refractory oxide aggregate, substantially all of which is coarser than 0.15 mm (+100 mesh), and (2) a carbonaceous matrix of from 2% to 30% graphite, substantially all finer than 0.4 mm (−35 mesh), 2% to 8% resin and from 0% to 6% other carbon material, said matrix being substantially free of oxide refractory material, all percentages being by weight and based on the total weight of the composition.

DETAILED DESCRIPTION

The refractory aggregate used in practicing the invention may be any such known material, for example, tabular alumina, calcined flint clay, and the like. However, the invention is most useful with periclase refractory aggregate. A particularly preferred aggregate is periclase containing at least 95% MgO.

In general, the aggregate will be sized according to wellknown principles to obtain maximum packing and density. However, in the practice of the invention, the sizing of the aggregate is different from that of conventional oxide refractories. In conventional refractories, the sizing of the aggregate ranges from a top size of, for example, 4.7 or 6.7 mm (−4 or −3 mesh) down to material finer than 44 microns (−325 mesh), the so-called sub-sieve size material or ball mill fines. This material finer than 44 microns can be as much as 15 or 20% of the total weight of the refractory aggregates in conventional compositions.

In the present invention, on the other hand, the oxide refractory aggregate is all coarser than 0.15 mm (100 mesh), and preferably is coarser than 0.2 mm (65 mesh), and most preferably contains no material smaller than 0.4 mm (35 mesh). It is the discovery of this invention that when the oxide refractory aggregate is confined to these coarser sizes, and the matrix material consists entirely of carbonaceous material, that the problems originally encountered in substituting the synthetic resin bond for the pitch bond, the decreased density and strength, are overcome.

The resin may be any such material, but is preferably a synthetic resin which is initially liquid, and remains so during the forming process, but which subsequently sets up, either at ambient temperature or under the application of limited heat, for example, temperatures up to 110° to 300° C. A particularly preferred form of resin is one of the phenol formaldehyde resins. These are described in detail in the article on "Phenolic Resins" in Mark-Gaylord's *Encyclopedia of Polymer Science and Technology*.

While the present invention is particularly useful with synthetic resins, such as the phenolic resins, it can also be used with "natural" resins, such as coal tar pitch, and the term "resin," as used in the specification and claims, is intended to include such materials.

The graphite used may be any such material, preferably of high purity, i.e., less than 10% ash, and most preferably is of the type known as "flake graphite".

The matrix of the brick of this invention can contain other carbonaceous material, for example, carbon black, such as thermal black or furnace black, ground anthracite, ground coke, and the like.

Refractory shapes are made from the composition of the present invention by mixing the various ingredients, for example in an Eirich of Muller mixer, pressing the composition into brick shape, for example on a mechanical press, at a pressure of up to 1400 kg/cm² (20,000 psi). The brick so formed are allowed to harden or they may be subjected to gentle heating, for example, to a temperature of 180° C., to hasten the setting of the resin bond. The brick are then shipped to the user who places them in a furnace structure, for example a basic oxygen furnace. The use of this invention is particularly advantageous when using a mechanical or toggle press, on which it has proven very difficult to press graphite-containing brick.

EXAMPLES

Table I sets forth various compositions, some of which are within the scope of this invention. Specifically, Compositions 3, 4, 6, 7, 8, and 9 are within the scope of the invention, the other compositions being comparison composition.

The aggregate used in the examples is a periclase having the following typical chemical composition: 2.3% CaO, 0.8% $SiO_2$, 0.2% $Al_2O_3$, 0.2% $Fe_2O_3$, 0.03% $B_2O_3$, and, by difference, 96.5% MgO. In Table I, the percentage amounts for the different grain sizes are based on the total weight of grain whereas the amounts of the other ingredients are based on parts by weight.

The graphites used were flake graphites manufactured by Asbury Graphite Mills, Inc., the various numbers indicated in Table I being grade designations applied by the manufacturer. Typically, the graphite has an ash content of 8%, the remainder being carbon. The carbon blacks are thermal blacks, the NS grade being manufactured by Cabot Corp. and the MT being manufactured by R. T. Vanderbilt. Typically, these are aggregates of roughly spherical particles with carbon contents greater than 97%, produced by the thermal decomposition of oil or natural gas.

TABLE I

| Composition | 1 | 2 | 3 | 4 | 5 | 6 | 7 | 8 | 9 |
|---|---|---|---|---|---|---|---|---|---|
| Aggregate | | | | | | | | | |
| amount | 84.3 | 84.5 | 84.5 | 84.5 | 78.8 | 78.8 | 78.0 | 78.0 | 65.9 |
| % 0.4 mm | 31.8 | 21.1 | 0 | 0 | 30.1 | 0 | 4.0 | 0 | 4.0 |
| % 0.2 mm | 28.4 | 18.3 | 0 | 0 | 28.8 | 0 | 0 | 0 | 0 |
| % 0.15 mm | 26.7 | 13.6 | 0 | 0 | 26.9 | 0 | 0 | 0 | 0 |
| % 44 | 17.0 | — | 0 | 0 | 17.2 | 0 | 0 | 0 | 0 |
| Graphite | | | | | | | | | |
| type | 3221 | 3166A | 3166A | 3166A | 3166A | 3166A | 3166A | 3166A | 3166A |
| amount | 7.5 | 9.6 | 9.6 | 9.6 | 12.4 | 12.4 | 16.0 | 16.0 | 28.1 |
| Carbon Black | | | | | | | | | |
| type | NS | MT | MT | MT | NS | NS | MT | MT | MT |
| amount | 2.4 | 2.9 | 2.9 | 2.9 | 2.7 | 2.7 | 2.9 | 2.9 | 2.9 |
| Bond | | | | | | | | | |
| type | pitch | phenol | phenol | phenol | pitch | pitch | phenol | phenol | phenol |
| amount | 5.3 | 3.0 | 3.0 | 3.0 | 5.6 | 5.6 | 3.1 | 3.1 | 3.1 |
| Sulfur - amount | 0.5 | 0 | 0 | 0 | 0.5 | 0.5 | 0 | 0 | 0 |
| Bulk Density | 184.4 | 180.9 | 183.2 | 184.0 | 176.1 | 178.1 | 176.9 | 178.3 | 162.4 |
| CMOR | 1800 | 812 | 1524 | 1416 | 1462 | 1443 | 1706 | 1595 | 942 |
| App. Porosity | 9.6 | 12.6 | 10.3 | 11.0 | 11.0 | 10.3 | 11.4 | 10.9 | 14.2 |
| Sonic Velocity | | | | | | | | | |
| L | — | 11.6 | — | 14.1 | 14.0 | 14.8 | — | 13.3 | 3.5 |
| W | — | 8.1 | — | 13.3 | 13.8 | 14.8 | — | 12.7 | 9.0 |
| T | — | 9.0 | — | 10.8 | 5.2 | 9.0 | — | 7.6 | 5.7 |
| Residual Carbon (wt %) | 12.5 | 13.3 | 13.4 | 13.4 | 18.4 | 18.4 | 19.1 | 19.0 | 31.3 |

As to the bonding materials, the pitch used was a 116° C. softening point (cube-in-air equivalent) coal tar pitch, and the resin was a phenol formaldehyde liquid bonding resin sold by the Borden Chemical Company under the name "Durite". It has a viscosity at 77° F. (25° C.) of from 250 to 350 cps, and a gel time at 121° C. of from 32 to 40 minutes. The sulfur added in the case of the pitch bond was flowers of sulfur, a very finely divided form of sulfur.

In Table I, bulk density is given in pounds per cubic foot, measured as the brick came off the press; cold modulus of rupture (CMOR) is given in pounds per square inch and measured after curing; apparent porosity is in volume percent, measured after coking; sonic velocity is in feet per second, measured along the length (L), width (W) and thickness (T) of the cured brick.

Composition 1 is a comparison composition which is typical of prior art tar bonded periclase refractory brick. As can be seen, it contains a substantial amount (17%) of material finer than 44 microns (−325 mesh). Composition 2 is another comparison example, and shows that the direct substitution of a synthetic resin bond for the pitch bond leads to greatly reduced densities and strengths, even though the amount of material under 44 microns is considerably less than in Composition 1.

The foregoing compositions are to be compared with Compositions 3 and 4, made according to the present invention. As can be seen from Table I, all the periclase aggregate finer than 0.4 mm has been eliminated from these compositions. This change resulted in brick of increased density compared to Composition 2, a density quite similar to that of brick made from Composition 1. The difference between Compositions 3 and 4 is in the maximum size of the periclase aggregate, Composition 3 containing aggregate all of which was smaller than 4.7 mm, and Composition 4 containing aggregate as large as 10 mm.

The sonic velocity shown in Table I for several of the compositions is an indication of the tightness or strength of bonding together of the aggregate particles, higher sonic velocity indicating better bonding. As can be seen, the sonic velocity in Composition 4 is significantly greater than that of Composition 2.

Composition 6 is a pitch-bonded brick with the sizing of the present invention, and shows, by comparison with Composition 5, the resulting improvement in properties.

Compositions 7, 8, and 9 are also within the scope of the present invention, Compositions 7 and 8 having sufficient carbonaceous material to result in a residual carbon content of about 19%, whereas that of Composition 9 is about 30%.

The residual carbon content of all these brick is determined by taking the brick, packing them in carbon granules in a closed container, heating to a temperature of 970° C. for 3 hours to coke them, and then, after cooling, weighing the coked brick. The specimen is then ignited to burn off all the carbon and again weighed, the difference in the two weights indicating the amount of residual carbon in the coked brick.

The brick whose properties are shown in Table I were made by mixing the indicated ingredients for 7 or 8 minutes in a Muller or Eirich mixer, depending on whether the bond was resin or pitch, and pressing the resulting mixture in a Boyd X press at a pressure of 5000 to 20,000 psi (350 to 1400 kg/cm$^2$), depending on composition.

From the foregoing examples, it can be seen that exclusion of the refractory oxide aggregate finer than 0.2 mm, and preferably excluding that finer than 0.4 mm, results in higher density for a resin-bonded product, as compared to the same composition containing oxide refractory material in the finer, or matrix, portion.

In addition to the improvement in quantitatively measurable properties, petrographic examination of the compositions of the present invention shows them to have better bond continuity and particle compaction than compositions with fine oxide particles. Also, in pressing, it was very difficult, if not impossible, to get crack-free brick with the compositions containing fine oxide material, whereas the compositions according to this invention pressed very well, without cracking.

In the specification and claims, percentages and parts are by weight unless otherwise indicated, except that porosities are expressed in volume percent. Mesh sizes referred to herein are Tyler standard screen sizes which are defined in Chemical Engineers' Handbook, John H. Perry, Editor-in-Chief, Third Edition, 1950, published by McGraw Hill Book Company, at page 963. For example, a 100 mesh screen opening corresponds to 147 microns, and 325 mesh to 44 microns. Analyses of mineral components are reported in the usual manner, expressed as simple oxides, e.g. MgO and SiO$_2$, although the components may actually be present in various combinations, e.g. as a magnesium silicate.

I claim:

1. A carbonaceous pressed refractory brick consisting essentially of (1) from 60 to 90% refractory oxide aggregate, substantially all of which is coarser than 0.15 mm, and (2) a carbonaceous matrix of from 9.6% to 28.1% graphite, substantially all finer than 0.4 mm, 2% to 8% resin, and from 0% to 6% other carbon material, said matrix being substantially free of oxide refractory material, all percentages being by weight and based on the total weight of the composition.

2. Composition according to claim 1 wherein the graphite is flake graphite.

3. Composition according to claim 1 wherein the resin is a phenol formaldehyde resin.

4. Composition according to claim 3 wherein the graphite is flake graphite.

5. Composition according to claim 1, 2, 3, or 4, wherein the aggregate is periclase.

6. Composition according to claim 5 wherein the periclase contains at least 95% MgO.

7. Composition according to claim 1, 2, 3, or 4, wherein the aggregate is all coarser than 0.2 mm.

8. Composition according to claim 1, 2, 3, or 4, wherein the aggregate is all coarser than 0.4 mm.

9. Composition according to claim 7 wherein the aggregate is periclase.

10. Composition according to claim 8 wherein the aggregate is periclase.

11. Composition according to claim 9 wherein the aggregate is periclase containing at least 95% MgO.

12. Composition according to claim 10 wherein the aggregate is periclase containing at least 95% MgO.

* * * * *